(12) United States Patent
Kano et al.

(10) Patent No.: US 9,810,132 B2
(45) Date of Patent: Nov. 7, 2017

(54) CATALYST DETERIORATION DIAGNOSIS APPARATUS

(71) Applicant: FUJI JUKOGYO KABUSHIKI KAISHA, Tokyo (JP)

(72) Inventors: Hiroyuki Kano, Tokyo (JP); Shinsuke Koike, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 26 days.

(21) Appl. No.: 15/050,794

(22) Filed: Feb. 23, 2016

(65) Prior Publication Data

US 2016/0251996 A1  Sep. 1, 2016

(30) Foreign Application Priority Data

Feb. 27, 2015 (JP) .................................. 2015-037721

(51) Int. Cl.
*F01N 11/00* (2006.01)

(52) U.S. Cl.
CPC ........ *F01N 11/007* (2013.01); *F01N 2550/02* (2013.01); *F01N 2560/025* (2013.01);
(Continued)

(58) Field of Classification Search
CPC ........... F01N 11/007; F01N 2900/0418; F01N 2900/1402; F01N 2560/025; F01N 2550/02; Y02T 10/47
(Continued)

(56) References Cited

U.S. PATENT DOCUMENTS 5,337,556 A    8/1994  Aihara
5,851,376 A    12/1998 Nishioka et al.
(Continued)

FOREIGN PATENT DOCUMENTS

JP    H09-203313 A    8/1997
JP    2008-121581     5/2008
(Continued)

OTHER PUBLICATIONS

Office Action issued on Apr. 26, 2016 in Japanese Patent Application No. 2015-037721. Japanese with English Translation. 6 Pages.

*Primary Examiner* — Daniel S Larkin
*Assistant Examiner* — Anthony W Megna Fuentes
(74) *Attorney, Agent, or Firm* — Smith, Gambrell & Russell, LLP

(57) ABSTRACT

A catalyst deterioration diagnosis apparatus includes an upstream side air-fuel ratio detector, a downstream side air-fuel ratio detector, an air-fuel ratio variation integrator that integrates the output variations of the respective air-fuel ratio detectors when a diagnosis running condition is satisfied, and a determiner that determines catalyst deterioration when the output variation integrated value of the upstream side air-fuel ratio detector exceeds a predetermined integration ending threshold, and further when a ratio between the output variation integrated value of the two detectors exceeds a predetermined determination threshold. The air-fuel ratio variation integrator holds the integrated values when the diagnosis running condition becomes unsatisfied before the integrated value of the upstream side air-fuel ratio detector reaches the integration ending threshold. The air-fuel ratio variation integrator resumes the integration using the held values as initial values when the diagnosis running condition is satisfied later again.

3 Claims, 5 Drawing Sheets

(52) U.S. Cl.
CPC .............. *F01N 2900/0418* (2013.01); *F01N 2900/1402* (2013.01); *Y02T 10/47* (2013.01)

(58) Field of Classification Search
USPC ..................................................... 73/114.75
See application file for complete search history.

(56) References Cited

U.S. PATENT DOCUMENTS

| | | | | |
|---|---|---|---|---|
| 2007/0163242 | A1* | 7/2007 | Matsuoka | F01N 3/025 60/286 |
| 2009/0308058 | A1* | 12/2009 | Iida | F01N 11/007 60/287 |
| 2010/0031736 | A1* | 2/2010 | Kushihama | G01M 15/11 73/114.04 |

FOREIGN PATENT DOCUMENTS

| | | |
|---|---|---|
| JP | 2008-138556 | 6/2008 |
| JP | 2013-163978 A | 8/2013 |

* cited by examiner

CATALYST DETERIORATION DIAGNOSIS APPARATUS

CROSS-REFERENCE TO RELATED APPLICATIONS

The present application claims priority from Japanese Patent Application No. 2015-037721 filed on Feb. 27, 2015, the entire contents of which are hereby incorporated by reference.

BACKGROUND

1. Technical Field

The present invention relates to a catalyst deterioration diagnosis apparatus that diagnoses deterioration of the catalyst of an engine and, more particularly, a catalyst deterioration diagnosis apparatus that can diagnose even in a situation where the diagnosis condition is not satisfied within a time period required for executing the diagnosis.

2. Related Art

For example, in a gasoline engine for vehicles, after-treatment of HC, CO or $NO_x$, such as contained in an exhaust gas, can be carried out by using a three way catalyst of which carrier may be made of alumina, for instance, with carrying noble metal, such as platinum, palladium, and rhodium.

Recently, due to needs for conforming to various government regulations, there has been demanded an on-board diagnosis technique that diagnoses the deterioration condition of a catalyst with high accuracy by relying only on devices available in the vehicle during its driving.

As a related art concerning the deterioration diagnosis of a catalyst, for example, Japanese Unexamined Patent Application Publication (JP-A) No. 2008-138556 discloses a technique for determining an abnormality using the estimated value of the $O_2$ storage amount of a catalyst obtained when the output of an $O_2$ sensor provided downstream of the catalyst is inverted from the lean side to the rich side.

In addition, JP-A No. 2008-121581 discloses a technique for calculating a deterioration diagnosis value based on the ratio between the output value variation integrated value of an air-fuel ratio sensor disposed upstream of a catalyst and the output value variation integrated value of an $O_2$ sensor disposed downstream of the catalyst and, when the deterioration diagnosis value exceeds a threshold, the deterioration of the catalyst is determined.

The above deterioration diagnosis of a catalyst needs to be performed more frequently than a certain frequency (e.g., as per driving cycle) during use of a vehicle.

As to a diagnosis running condition to execute such a catalyst degradation diagnosis, there is a need for elapsing time that is required for the diagnosis (e.g., approximately several tens of seconds) while the vehicle speed, the amount of accelerator operation, and the like fall within a predetermined range under the condition without abrupt change.

However, depending on the characteristics of a market where the vehicle is introduced, the diagnosis running condition is more likely not to be satisfied before a period becomes long enough for executing the diagnosis, which diagnosis frequency turns out being not adequately secured. This may be caused by frequently occurring traffic congestion, the driver's frequent on-off operations of the accelerator pedal, and so on.

SUMMARY OF THE INVENTION

It is desirable to provide a catalyst deterioration diagnosis apparatus that can perform diagnosis even when the diagnosis condition is not satisfied within the time period required for executing the diagnosis.

A first aspect of the present invention provides a catalyst deterioration diagnosis apparatus that diagnoses deterioration of a catalyst converter to which exhaust gas of an engine is introduced. The apparatus includes an upstream side air-fuel ratio detector that detects an air-fuel ratio of the exhaust gas being introduced to the catalyst converter, a downstream side air-fuel ratio detector that detects an air-fuel ratio of the exhaust gas being discharged from the catalyst converter, an air-fuel ratio variation integrator that calculates an output variation integrated value of the upstream side air-fuel ratio detector and an output variation integrated value of the downstream side air-fuel ratio detector when a predetermined diagnosis running condition is satisfied, and a determiner that determines catalyst deterioration of the catalyst converter when the output variation integrated value of the upstream side air-fuel ratio detector exceeds a predetermined integration ending threshold, and further when a ratio of the output variation integrated value of the downstream side air-fuel ratio detector to the output variation integrated value of the upstream side air-fuel ratio detector exceeds a predetermined determination threshold. When the diagnosis running condition becomes unsatisfied before the output variation integrated value of the upstream side air-fuel ratio detector reaches the integration ending threshold, the air-fuel ratio variation integrator holds the current output variation integrated value of the upstream side air-fuel ratio detector and the current output variation integrated value of the downstream side air-fuel ratio detector. When the diagnosis running condition is satisfied later again, the air-fuel ratio variation integrator resumes integration of the output variation integrated values using the held output variation integrated value of the upstream side air-fuel ratio detector and the held output variation integrated value of the downstream side air-fuel ratio detector as initial values.

When the engine stops operating before the output variation integrated value of the upstream side air-fuel ratio detector reaches the integration ending threshold, the air-fuel ratio variation integrator may hold the current output variation integrated value of the upstream side air-fuel ratio detector and the current output variation integrated value of the downstream side air-fuel ratio detector. When the engine restarts and the diagnosis running condition is satisfied later, the air-fuel ratio variation integrator may resume integration of the output variation integrated values using the held output variation integrated value of the upstream side air-fuel ratio detector and the held output variation integrated value of the downstream side air-fuel ratio detector as initial values.

When a remaining amount of fuel is equal to or less than a predetermined lower limit at an end of the engine operation, the air-fuel ratio variation integrator may reset the output variation integrated value of the upstream side air-fuel ratio detector and the output variation integrated value of the downstream side air-fuel ratio detector.

The catalyst deterioration diagnosis may further includes a misfire detector that detects a misfire of the engine, in which, when a frequency of a misfire detected by the misfire detector is equal to or more than a predetermined misfire determination threshold, the air-fuel ratio variation integrator may reset the output variation integrated value of the upstream side air-fuel ratio detector and the output variation integrated value of the downstream side air-fuel ratio detector.

DETAILED DESCRIPTION

Example

A catalyst deterioration diagnosis apparatus according to an example of the present invention will be described.

The catalyst deterioration diagnosis apparatus according to the example is provided in a four-stroke direct gasoline-injection engine mounted in a vehicle, such as a passenger car.

Figure 1:
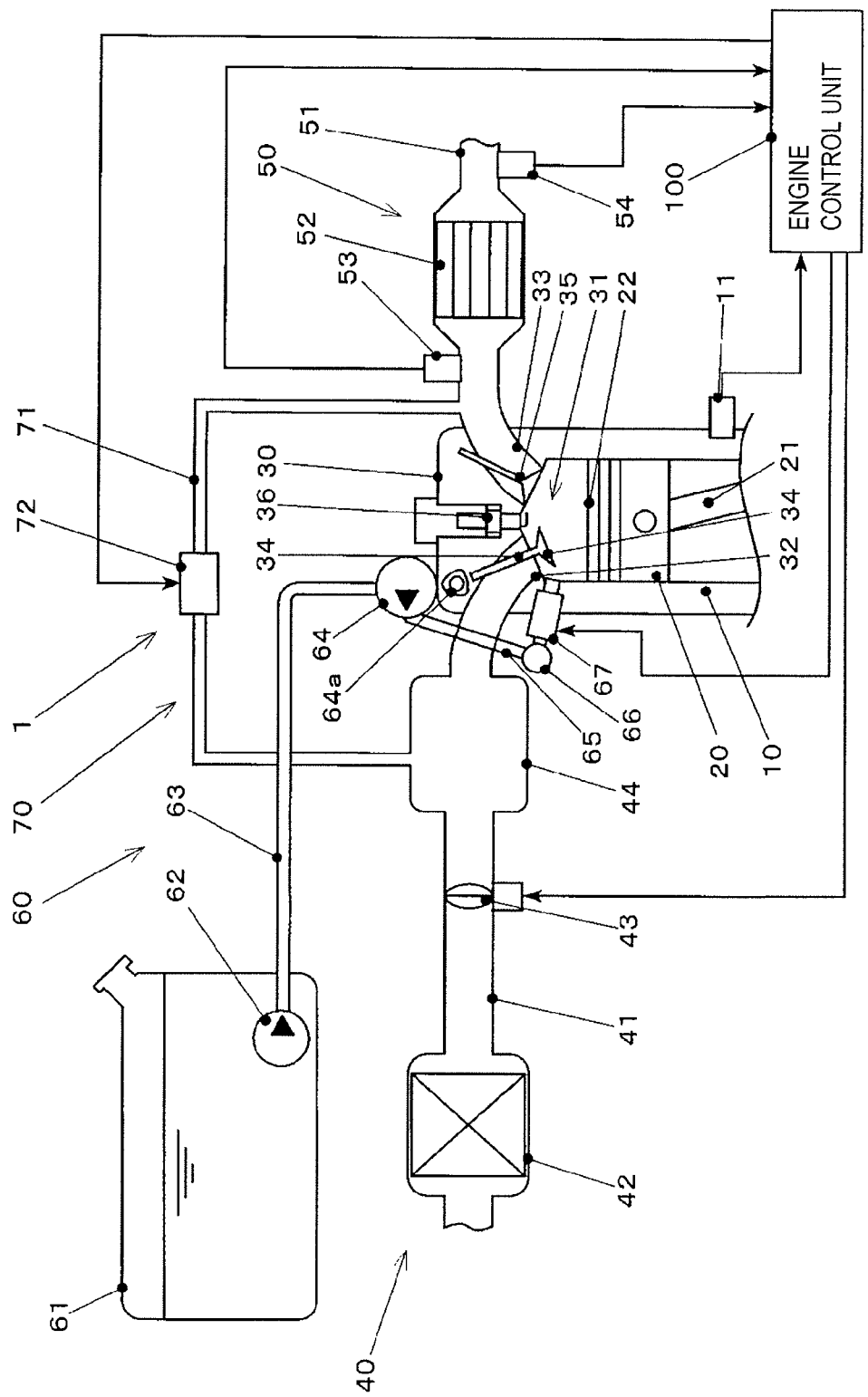
FIG. 1 illustrates the structure of an engine including a catalyst deterioration diagnosis apparatus according to an example of the invention.

FIG. 1 is a schematic view illustrating the structure of an engine having the catalyst deterioration diagnosis apparatus according to the example.

An engine 1 includes a cylinder 10, a piston 20, a cylinder head 30, an intake device 40, an exhaust system 50, a fuel supply device 60, an EGR device 70, and an engine control unit 100.

The cylinder 10 has a sleeve into which the piston 20 is inserted.

The cylinder 10 is formed into a cylinder block shape by being integrated with a crank case (not illustrated).

The crank case rotatably supports and accommodates a crankshaft (not illustrated) that is an output shaft of the engine 1.

The cylinder 10 has a water temperature sensor 11 that detects the temperature of cooling water circulating through a water jacket formed around the cylinder head 30 and the sleeve.

The output of the water temperature sensor 11 is transmitted to the engine control unit 100.

The crankshaft has a crank angle sensor (not illustrated) that successively outputs a pulse signal that depends on the angular position of the crankshaft.

The engine control unit 100 can detect the rotational speed of the crankshaft substantially in real time based on history of the output value of the crank angle sensor. The detected rotational speed of the crankshaft may be used to detect a misfire, which is a phenomenon that air-fuel mixture does not ignite normally in a particular ignition cycle of a particular cylinder in the engine 1, for example.

The piston 20 is a member that is inserted into the sleeve of the cylinder 10 and performs reciprocating motion.

The piston 20 is connected to the crankshaft (not illustrated) via a connecting rod 21.

A crown surface 22 of the piston 20 and the cylinder head 30 constitute the combustion chamber of the engine 1.

The cylinder head 30 is provided at an end of the cylinder 10 opposite to the crankshaft.

The cylinder head 30 includes a combustion chamber 31, an intake port 32, an exhaust port 33, an intake valve 34, an exhaust valve 35, and an ignition plug 36.

The combustion chamber 31 is a concave portion formed so as to face the crown surface 22 of the piston 20 and has, for example, a pent roof shape.

The shape of the combustion chamber will be described in detail later.

The intake port 32 is a flow passage through which combustion air (fresh air) is introduced to the combustion chamber 31.

The exhaust port 33 is a flow passage through which burnt gas (exhaust gas) is discharged from the combustion chamber 31.

Each cylinder is provided with, for example, two intake ports 32 and two exhaust ports 33.

The intake valve 34 and the exhaust valve 35 open and close the intake port 32 and the exhaust port 33, respectively, at a predetermined valve timing.

The intake valve 34 and the exhaust valve 35 are driven by a valve drive system, including a camshaft and rocker arm.

The ignition plug 36 generates a spark at a predetermined ignition timing in accordance with an ignition signal generated by the engine control unit 100 and ignites air-fuel mixture.

The ignition plug 36 is disposed substantially at the center of the combustion chamber 31 (i.e., in the vicinity of the center axis of the cylinder 10).

The intake device 40 introduces combustion air to the engine 1.

The intake device 40 includes an intake duct 41, an air cleaner 42, a throttle 43, and an intake manifold 44.

The intake duct 41 is a conduit that introduces air from the atmosphere and supplies it to the engine 1.

The air cleaner 42 is provided in the vicinity of the inlet of the intake duct 41 and filters dust and the like in the introduced air and purifies it.

The air cleaner 42 has, at its outlet, an air flow meter (not illustrated) that measures the amount of air passing through the intake duct 41 (i.e., the amount of air sucked by the engine 1).

The throttle 43 is provided downstream of the air cleaner 42 in the intake duct 41 and adjusts the output of the engine 1 by reducing the amount of air sucked.

The throttle 43 includes a valve body, such as a butterfly valve, an electric actuator (throttle actuator) that drives the valve body, and a throttle sensor that detects a throttle opening.

The throttle actuator is driven in accordance with a control signal from the engine control unit 100.

The intake manifold 44 is provided downstream of the throttle 43 and includes a surge tank formed in a container shape and a branch pipe. The branch pipe is coupled to the intake port 32 of each cylinder and introduces fresh air.

The exhaust system 50 discharges exhaust gas from the engine 1.

The exhaust system 50 includes an exhaust pipe 51, a catalyst converter 52, an air-fuel ratio sensor 53, and a rear $O_2$ sensor 54.

The exhaust pipe 51 is a conduit through which exhaust gas from the exhaust port 33 is discharged.

The catalyst converter 52 is provided in an intermediate portion of the exhaust pipe 51.

The catalyst converter 52 has a three way catalyst that includes noble metal, such as platinum and rhodium, carried by an alumina carrier with a honeycomb structure and purifies HC, $NO_x$, CO, and the like.

The air-fuel ratio (A/F) sensor 53 is a linear output lambda sensor that detects the current air-fuel ratio of the engine 1 based on the properties of exhaust gas.

The air-fuel ratio sensor 53 is provided in a portion of the exhaust pipe 51 upstream of the catalyst converter 52.

In one example of the present invention, the air-fuel ratio sensor 53 may serve as an "upstream side air-fuel ratio detector".

The rear $O_2$ sensor 54 detects the oxygen content of exhaust gas having passed through the catalyst converter 52.

The rear $O_2$ sensor 54 is structured by coating the inner surface (atmosphere side) and the outer surface of (exhaust gas side) of a cylinder made of zirconia with platinum and generates an electromotive force that is caused by differences in the oxygen concentration.

The rear $O_2$ sensor 54 generates a voltage when the air-fuel ratio is larger than a theoretical air-fuel ratio and generates substantially no voltage when the air-fuel ratio is smaller.

The rear $O_2$ sensor 54 is provided in a portion of the exhaust pipe 51 downstream of the catalyst converter 52.

In one example of the present invention, the rear $O_2$ sensor 54 may serve as a "downstream side air-fuel ratio detector".

The fuel supply device 60 includes a fuel tank 61, a feed pump 62, a fuel transport pipe 63, a high-pressure pump 64, a fuel pipe 65, a delivery pipe 66, and an injector 67.

The fuel tank 61 is a container that stores fuel (gasoline) and is disposed, for example, under the floor at the rear of the vehicle body.

The feed pump (low pressure pump) 62 press-feeds fuel in the fuel tank 61 to the high-pressure pump 64 via the fuel transport pipe 63.

The high-pressure pump 64 increases the pressure of fuel supplied from the feed pump 62 and supplies the fuel to the delivery pipe 66 that is also used as an accumulating chamber, via the fuel pipe 65.

The high-pressure pump 64 is provided in the cylinder head 30 and driven by a cam shaft 64a that drives the intake valve 34.

The injector 67 has a needle valve driven by an actuator including, for example, a solenoid and piezo element and injects pressurized fuel accumulated in the delivery pipe 66 by a predetermined amount at a predetermined time in accordance with an injection signal (valve opening signal) generated by the engine control unit 100.

As illustrated in FIG. 1, the nozzle of the injector 67 is inserted into the cylinder from a position that is on the side (cylinder bore side) surface of the combustion chamber 31 and is close to the intake valve 34.

The EGR device 70 extracts a part of exhaust gas flowing through the exhaust pipe 51 and introduces (recirculates) it to the intake manifold 44.

The EGR device 70 includes an EGR conduit 71 and an EGR valve 72.

The EGR conduit 71 is a conduit through which exhaust gas is transferred from the exhaust pipe 51 to the intake manifold 44.

One end of the EGR conduit 71 is connected with a portion upstream of the catalyst converter 52 in the exhaust pipe 51.

The other end of the EGR conduit 71 is connected with a surge tank unit of the intake manifold 44.

The EGR valve 72 is provided in an intermediate portion of the EGR conduit 71 and controls the flow rate of exhaust gas passing through the EGR conduit 71.

The opening and closing of the EGR valve 72 are controlled in accordance with a control signal from the engine control unit 100.

The engine control unit 100 controls the engine 1 and auxiliaries thereof in a centralized manner.

The engine control unit 100 includes an information processing unit, such as CPU, storage units, such as RAM and ROM, an input-output interface, and a bus interconnecting these components.

Based on the amount of air sucked by the engine 1 detected by an air flow meter, the opening of the throttle valve detected by a throttle sensor, the rotational speed of the crankshaft detected by a crank angle sensor (not illustrated), and the like, the engine control unit 100 sets the amount of fuel to be injected and the number of injections for each cycle of the injector 67 of each cylinder, and sets the injection timing (injection start timing and injection end timing) of fuel injection for each time, and outputs an injection signal (valve opening signal) to the injector 67.

In addition, the engine control unit 100 has a function of diagnosing deterioration of the catalyst converter 52.

In one example of the present invention, the engine control unit 100 may serve as an "air-fuel ratio variation integrator", a "determiner", and a "misfire detector".

The engine control unit 100 diagnoses deterioration of the catalyst converter 52 by comparing an output variation integrated value of the air-fuel ratio sensor 53 (hereinafter referred to as a "first integrated value") with an output variation integrated value of the rear $O_2$ sensor 54 (hereinafter referred to as a "second integrated value"). The first integrated value is obtained by integrating the variation (absolute value) of the value obtained by λconversion of an output voltage of the air-fuel ratio sensor 53. On the other hand, the second integrated value is obtained by integrating the variation (absolute value) of an output voltage of the rear $O_2$ sensor 54 for the same period as the first integrated value.

When the catalyst converter 52 deteriorates, the output variation of the rear $O_2$ sensor 54 becomes larger than the output variation of the air-fuel ratio sensor 53. Therefore, if a ratio of the second integrated value to first integrated value is no less than a predetermined determination threshold, the catalyst deterioration is determined.

Figure 2:
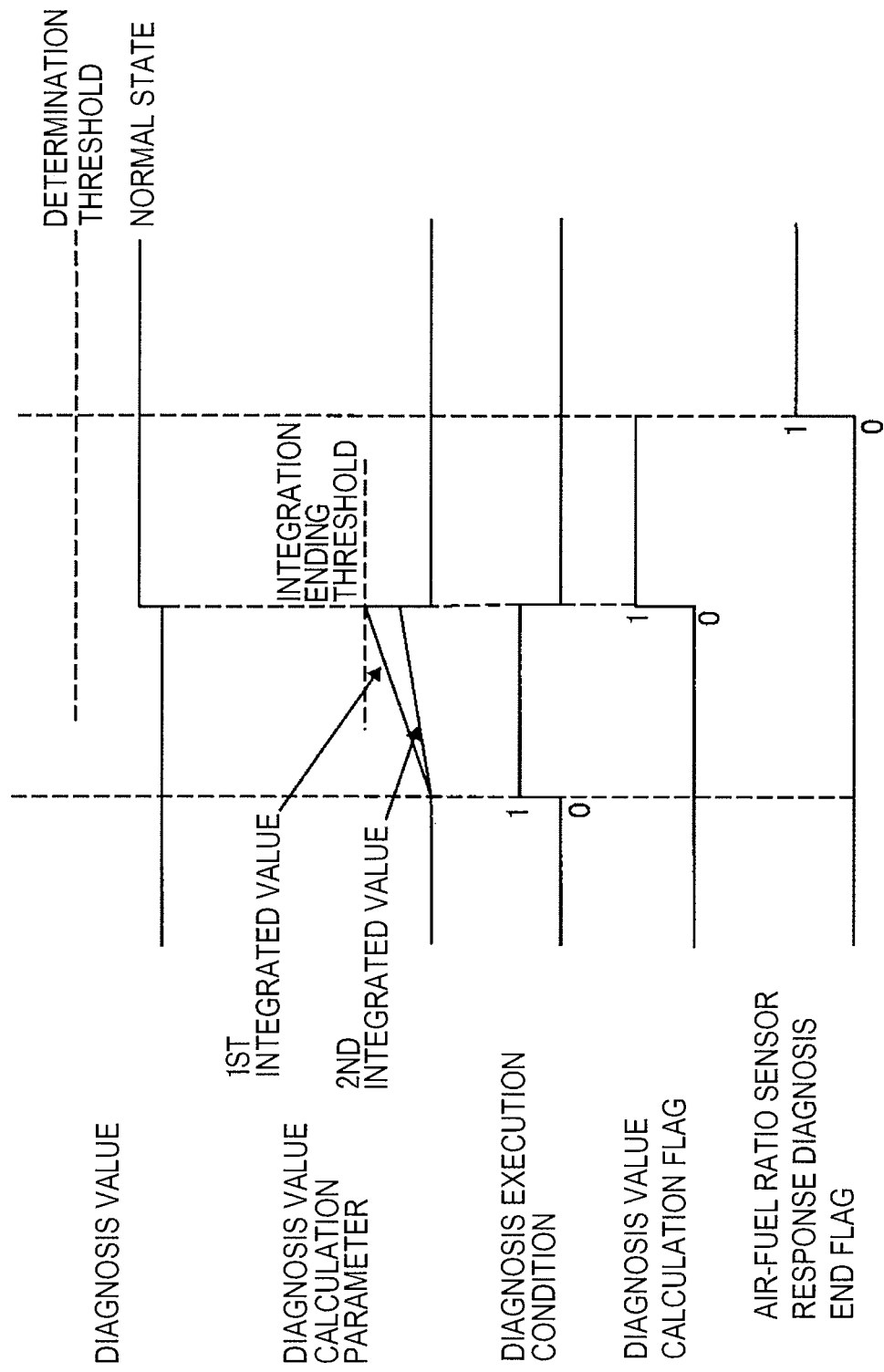
FIG. 2 is a timing chart illustrating an instance of changes in parameters for diagnosis in the catalyst deterioration diagnosis apparatus according to the example (when the catalyst is normal).
Figure 3:
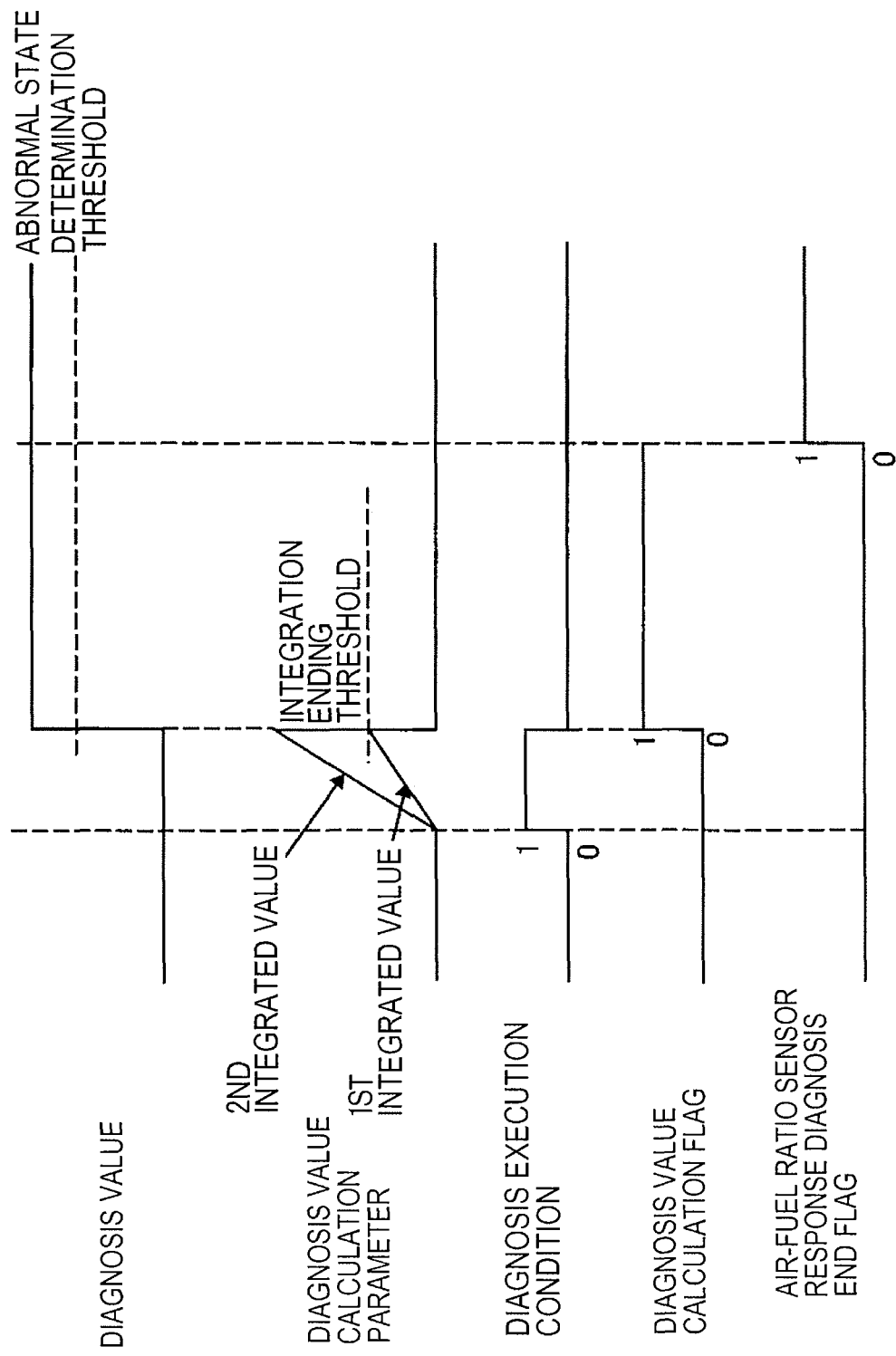
FIG. 3 is a timing chart illustrating an instance of changes in parameters for diagnosis in the catalyst deterioration diagnosis apparatus according to the example (when the catalyst deteriorates).

FIGS. 2 and 3 are timing charts illustrating examples of parameter changes in diagnosis performed by the catalyst deterioration diagnosis apparatus. FIG. 2 illustrates the case in which the catalyst is in the normal condition, while FIG. 3 illustrates the case in which the catalyst is in a deteriorated state.

As illustrated in FIG. 2, for the integration of the first integrated value as well as the second integrated value start when a predetermined diagnosis running condition is satisfied (i.e., when a flag changes from 0 to 1).

The diagnosis running condition may be such that the travel speed (vehicle speed) of the vehicle falls within a predetermined range, the operation amount of an accelerator pedal and its fluctuation amount fall within a predetermined range, the cooling water temperature is not less than a predetermined value (after completion of warm-up), or no on-board abnormality diagnosis other than catalyst deterioration diagnosis shows an abnormal state.

The output voltage of the air-fuel ratio sensor 53 is subject to λ conversion, and the absolute value of the variation is integrated successively, so that the first integrated value n is obtained.

The absolute value of the variation in the output voltage of the rear $O_2$ sensor 54 is integrated successively, so that the second integrated value is obtained.

The first and second integrated values are integrated by the engine control unit 100 until the first integrated value reaches an integration ending threshold, which is a predetermined value.

After the first integrated value reaches the integration ending threshold, the engine control unit 100 stops the integration of the first and second integrated values and calculates the ratio of the second integrated value to the first integrated value as a diagnosis value.

In the normal state illustrated in FIG. 2, the second integrated value becomes relatively smaller than the first integrated value, the diagnosis value becomes smaller than the preset determination threshold, and the catalyst is determined to be in the normal state.

After that, when response diagnosis of the air-fuel ratio sensor is completed and the flag changes from 0 to 1, the normal determination is confirmed.

In contrast, in the abnormal state (the state in which deterioration of the catalyst converter 52 has developed) illustrated in FIG. 3, the second integrated value becomes relatively larger than the first integrated value, the diagnosis value becomes larger than the preset determination threshold, and the catalyst is determined to be in the abnormal state.

In addition, when, after the integration starts, the diagnosis running condition becomes unsatisfied before the first and second integrated values are each reached to a sufficient level for executing the diagnosis, the catalyst deterioration diagnosis apparatus according to the example holds the first integrated value and the second integrated value at the timing of the diagnosis running condition being unsatisfied. In this situation, as the diagnosis running condition is satisfied again, the catalyst deterioration diagnosis apparatus resumes the integration with employing the held values as initial values.

This function will be described in detail below.

Figure 4:
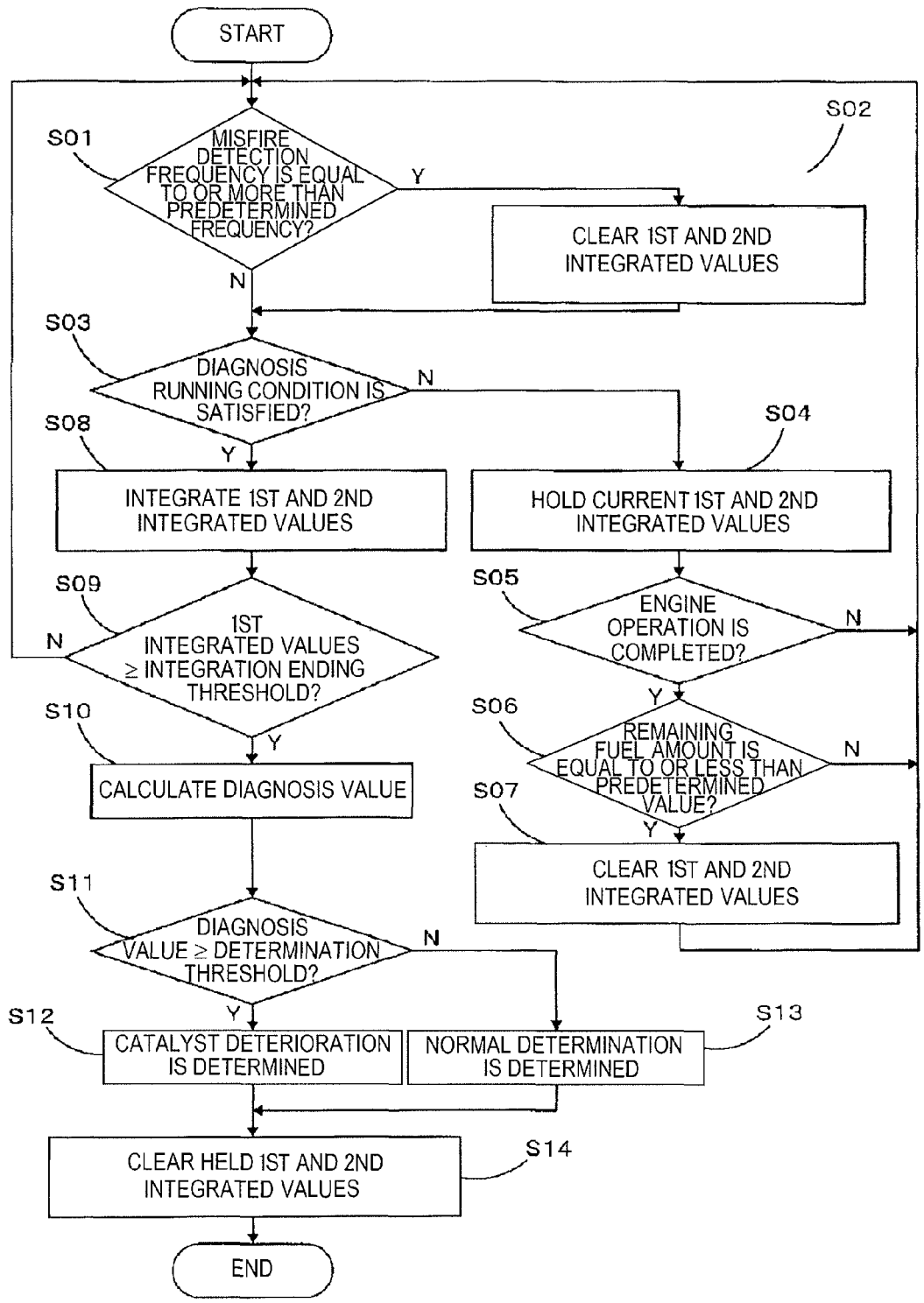
FIG. 4 is a flowchart illustrating the operation of the catalyst deterioration diagnosis apparatus according to the example.

FIG. 4 is a flowchart illustrating the operation of the catalyst deterioration diagnosis apparatus according to the example.

The steps of the operation will be described in sequence below.

<Step S01: Determining Misfire Frequency>

The engine control unit 100 detects the frequency of a misfire in the latest predetermined period.

For instance, a misfire can be detected based on significant reduction in the rotational speed of the crankshaft in the angular position range equivalent to the combustion stroke (expansion stroke) of a particular cylinder as compared with other ranges.

The engine control unit 100 compares the frequency of a misfire detected in the predetermined period with a predetermined value. When a misfire occurred at a frequency equal to or larger than the predetermined value, the flow proceeds to step S02. When the frequency of a misfire is less than the predetermined value, the flow proceeds to step S03.

<Step S02: Clearing First and Second Integrated Values>

The engine control unit 100 clears the held (currently stored) first and second integrated values to reset them to 0.

After that, the flow proceeds to step S03.

<Step S03: Examining Whether Diagnosis Running Condition is Satisfied>

The engine control unit 100 examines whether the above diagnosis running condition is satisfied currently.

When the diagnosis running condition is satisfied, the flow proceeds to step S08. When the diagnosis running condition is not satisfied, the flow proceeds to step S04.

<Step S04: Holding First and Second Integrated Values>

The engine control unit 100 keeps holding the current stored first and second integrated values without clearing them.

After that, the flow proceeds to step S05.

<Step S05: Examining Engine Operation>

The engine control unit 100 examines whether the operation of the engine 1 has been completed (stopped).

When the engine stops operating, the flow proceeds to step S06. Otherwise, the flow returns to step S01 and repeats the subsequent steps.

<Step S06: Examining the Remaining Amount of Fuel>

The engine control unit 100 detects the amount of fuel remaining in the fuel tank 61 (hereinafter referred to as a "remaining fuel amount"), based on the output of a fuel level sensor (not illustrated) that detects the fuel level in the fuel tank 61.

When the remaining fuel amount is equal to or less than a predetermined value (lower limit), the flow proceeds to step S07 since the engine may have been stopped due to fuel shortage. Otherwise, the flow returns to step S01 and repeats the subsequent steps.

<Step S07: Clearing First and Second Integrated Value>

The engine control unit 100 clears the currently held first and second integrated values to reset them to 0.

After that, the flow returns to step S01 and repeats the subsequent steps.

<Step S08: Integrating First and Integrated Values>

The engine control unit 100 integrates the absolute values of the first integrated value and the absolute value of the second integrated value, which are received successively, with the first integrated value and second integrated value respectively so as to make the updated values to be held values (initial values for the next integration).

After that, the flow proceeds to step S09.

<Step S09: Comparing First Integrated Value with Integration Ending Threshold>

The engine control unit 100 compares the first integrated value currently held with the integration ending threshold, which is a predetermined value.

When the first integrated value is equal to or more than the integration ending threshold, the first and second integrated values are no longer integrated, and the flow proceeds to step S10. Otherwise, the flow returns to step S01 and repeats the subsequent steps.

<Step S10: Calculating Diagnosis Value>

The engine control unit 100 calculates a diagnosis value that is the ratio of the second integrated value currently held to the first integrated value currently held.

After that, the flow proceeds to step S11.

<Step S11: Examining Diagnosis Value>

The engine control unit 100 compares the diagnosis value calculated in step S10 with the determination threshold, which is a predetermined value.

When the diagnosis value is equal to or more than the determination threshold, the flow proceeds to step S12. Otherwise, the flow proceeds to step S13.

<Step S12: Determining Catalyst Deterioration>

The engine control unit 100 determines that the catalyst deteriorates and performs a predetermined process, such as outputting a warning.

After that, the flow proceeds to step S14.

<Step S13: Determining Normal Condition>

The engine control unit 100 determines that the catalyst is in the normal condition.

After that, the flow proceeds to step S14.

<Step S14: Clearing First and Second Integrated Values>

To prepare for the next diagnosis, the engine control unit 100 clears the held (currently stored) values of the first and second integrated values to reset their values to 0.

After that, the flow is exited.

Figure 5:
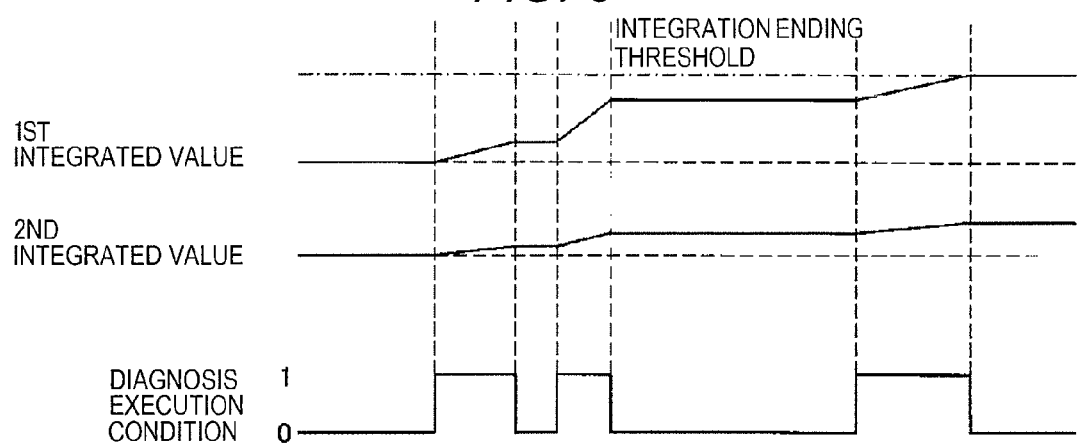
FIG. 5 is a graph illustrating an instance of changes of integrated values of output variations when the diagnosis running condition becomes unsatisfied while the integrated values of the output variations are integrated in the catalyst deterioration diagnosis apparatus according to the example.

FIG. 5 is a chart illustrating examples of the changes of the first and second integrated values when the diagnosis running condition becomes unsatisfied while the first and second integrated values are each being integrated by the catalyst diagnosis apparatus according to the example.

As illustrated in FIG. 5, when the diagnosis running condition becomes unsatisfied before the first integrated value reaches the integration ending threshold, the engine control unit 100 holds the current first and second integrated values and, when the diagnosis running condition is satisfied again, resumes the integration using the held values as initial values. After that, when the first integrated value reaches the integration ending threshold, the engine control unit 100 calculates and examines the diagnosis value.

Accordingly, even in the case where the integration of the first and second integrated values necessary for diagnosis fails to complete during an individual diagnosis running condition satisfying period, diagnosis can be completed by accumulating the first and second integrated values that are integrated over a plurality of diagnosis running condition satisfying periods.

As described above, according to the example, the following effects can be obtained.

(1) When the diagnosis running condition becomes unsatisfied during integration of the first and second integrated values, the first and second integrated values having been integrated up to the present time are held and, when the diagnosis running condition is satisfied again, the integration is resumed using the held values as initial values. Even when the determination cannot be made in a single time period during which the diagnosis running condition must be kept on satisfying, determination can be made by accumulating the first and second integrated values over a plurality of diagnosis running condition satisfying periods.

Accordingly, it is possible to provide a catalyst deterioration diagnosis apparatus that can perform diagnosis even when the diagnosis condition is not satisfied for the time period required for executing the diagnosis.

(2) When the engine operation stops (the driving cycle is completed), the current first and second integrated values are held. Thus, even when the determination cannot be made in a single driving cycle, determination can be eventually made over a plurality of driving cycles.

(3) When the engine stops operating in a state in which the remaining fuel amount is equal to or less than a predetermined value, there is concern about rapid heat deterioration of the catalyst converter 52 due to a misfire caused by fuel shortage. Therefore, the first and second integrated values are reset to 0 and integration is performed again, so that the diagnosis accuracy can be improved.

(4) When a misfire is detected at a frequency equal to or larger than the predetermined value, it is determined that the heat deterioration of the catalyst is possibly developing rapidly, and the first and second integrated values are set to 0 and integration is performed again. As a result, the diagnosis accuracy can be improved.

As described above, according to the example of the invention, it is possible to provide a catalyst deterioration diagnosis apparatus that can perform diagnosis even when the diagnosis condition is not satisfied for the time period required for executing the diagnosis.

(Modification)

The invention is not limited to the above example and various modifications and changes are allowed. These modifications and changes are also included in the technical scope of the invention.

The structures of the engine and the catalyst deterioration diagnosis apparatus are not limited to the structures according to the above example and may be changed as appropriate. For example, in one example of the present invention, a linear A/F sensor may serve as a "upstream side air-fuel ratio detector" and an $O_2$ sensor may as a "downstream side air-fuel ratio detector". Alternatively, a linear A/F sensor may also be used on the downstream side. In addition, the invention is not limited to the structure in which the air-fuel ratio detector is provided in the exhaust pipe, and the structure in which the air-fuel ratio detector is provided at the inlet and outlet of the housing of the catalyst converter is also possible.

In addition, other conditions may be implemented appropriately in addition to the conditions adopted in the example for the determination of holding the current first and second integrated values when the diagnosis running condition becomes unsatisfied during integrating the first integrated value.

In the above example, the current first and second integrated values are held upon completion of a driving cycle unless a particular reason such as fuel shortage is present. Alternatively, these integrated values may be reset as an alternative program upon completion of a driving cycle.

The invention claimed is:

1. A catalyst deterioration diagnosis apparatus that diagnoses deterioration of a catalyst converter to which exhaust gas of an engine is introduced, the apparatus comprising:
    an upstream side air-fuel ratio detector configured to detect an air-fuel ratio of the exhaust gas being introduced to the catalyst converter;
    a downstream side air-fuel ratio detector configured to detect an air-fuel ratio of the exhaust gas being discharged from the catalyst converter;
    an air-fuel ratio variation integrator configured to calculate an output variation integrated value of the upstream side air-fuel ratio detector and an output variation integrated value of the downstream side air-fuel ratio detector when a predetermined diagnosis running condition is satisfied; and
    a determiner configure to determine catalyst deterioration of the catalyst converter when the output variation integrated value of the upstream side air-fuel ratio detector exceeds a predetermined integration ending threshold, and further when a ratio of the output variation integrated value of the downstream side air-fuel ratio detector to the output variation integrated value of the upstream side air-fuel ratio detector exceeds a predetermined determination threshold, wherein the air-fuel ratio variation integrator is configured to hold the current output variation integrated value of the upstream side air-fuel ratio detector and the current output variation integrated value of the downstream side air-fuel ratio detector when the engine stops operating and the diagnosis running condition becomes unsatisfied before the output variation integrated value of the upstream side air-fuel ratio detector reaches the integration ending threshold, the air-fuel ratio variation integrator is configured to resume integration of the output variation integrated values using the held output variation integrated value of the upstream side air-fuel ratio detector and the held output variation integrated value of the downstream side air-fuel ratio detector as initial values when later the engine restarts and the diagnosis running condition is satisfied again, and the air-fuel ratio variation integrator is configured to reset the output variation integrated value of the upstream side air-fuel ratio detector and the output variation integrated value of the downstream side air-fuel ratio detector when a remaining amount of fuel is equal to or less than a predetermined lower limit at an end of operation of the engine.

2. The catalyst deterioration diagnosis apparatus according to claim 1, further comprising: a misfire detector that detects a misfire of the engine, wherein the air-fuel ratio variation integrator is configured to reset the output variation integrated value of the upstream side air-fuel ratio detector and the output variation integrated value of the downstream side air-fuel ratio detector when a frequency of a misfire detected by the misfire detector is equal to or more than a predetermined misfire determination threshold.

3. A catalyst deterioration diagnosis apparatus that diagnoses deterioration of a catalyst converter to which exhaust gas of an engine is introduced, the apparatus comprising:

an upstream side air-fuel ratio detector configured to detect an air-fuel ratio of the exhaust gas being introduced to the catalyst converter;

a downstream side air-fuel ratio detector configured to detect an air-fuel ratio of the exhaust gas being discharged from the catalyst converter;

an air-fuel ratio variation integrator configured to calculate an output variation integrated value of the upstream side air-fuel ratio detector and an output variation integrated value of the downstream side air-fuel ratio detector when a predetermined diagnosis running condition is satisfied;

a determiner configured to determine catalyst deterioration of the catalyst converter when the output variation integrated value of the upstream side air-fuel ratio detector exceeds a predetermined integration ending threshold, and further when a ratio of the output variation integrated value of the downstream side air-fuel ratio detector to the output variation integrated value of the upstream side air-fuel ratio detector exceeds a predetermined determination threshold; and a misfire detector configured to detect a misfire of the engine, wherein the air-fuel ratio variation integrator is configured to hold the current output variation integrated value of the upstream side air-fuel ratio detector and the current output variation integrated value of the downstream side air-fuel ratio detector when the diagnosis running condition becomes unsatisfied before the output variation integrated value of the upstream side air-fuel ratio detector reaches the integration ending threshold, and the air-fuel ratio variation integrator is configured to resume integration of the output variation integrated values using the held output variation integrated value of the upstream side air-fuel ratio detector and the held output variation integrated value of the downstream side air-fuel ratio detector as initial values when the diagnosis running condition is satisfied later again, and the air-fuel ratio variation integrator is configured to reset the output variation integrated value of the upstream side air-fuel ratio detector and the output variation integrated value of the downstream side air-fuel ratio detector when a frequency of a misfire detected by the misfire detector is equal to or more than a predetermined misfire determination threshold.

* * * * *